US005773827A

United States Patent [19]

Yazdy et al.

[11] Patent Number: 5,773,827

[45] Date of Patent: Jun. 30, 1998

[54] XEROGRAPHIC INFRARED REFLECTANCE DENSITOMETER (IRD) SENSOR

[75] Inventors: Mostafa R. Yazdy, Los Angeles; Mehrdad Zomorrodi, West Hills; Harry J. McIntyre, Los Angeles, all of Calif.; Alan J. Werner, Jr., Rochester, N.Y.

[73] Assignee: Xerox Corporation, Stamford, Conn.

[21] Appl. No.: 764,888

[22] Filed: Dec. 16, 1996

[51] Int. Cl.[6] .......................... G03G 21/00; G01N 21/47

[52] U.S. Cl. .......................... 250/341.8; 399/27; 399/49; 399/64; 399/74

[58] Field of Search .......................... 250/341.8; 399/27, 399/49, 64, 74

[56] References Cited

U.S. PATENT DOCUMENTS

| | | | |
|---|---|---|---|
| 4,550,254 | 10/1985 | Zomorrodi et al. | 250/338.1 |
| 4,950,905 | 8/1990 | Butler et al. | 250/458.1 |
| 4,989,985 | 2/1991 | Hubble, III et al. | 356/445 |
| 5,083,161 | 1/1992 | Borton et al. | 399/49 |

*Primary Examiner*—Constantine Hannaher
*Attorney, Agent, or Firm*—Fariba Rad

[57] ABSTRACT

An infrared reflectance densitometer (IRD) sensor which utilizes four blocks each of which generates an element of a given equation and a fifth block which generates an output voltage based on the given equation. The IRD sensor eliminates a problem known as hunting.

1 Claim, 6 Drawing Sheets

XEROGRAPHIC INFRARED REFLECTANCE DENSITOMETER (IRD) SENSOR

BACKGROUND OF THE INVENTION

This invention relates to an infrared reflectance densitometer (IRD) sensor, and more particularly, to an IRD sensor which is used in a xerographic copying or printing system. The IRD sensor of this invention eliminates noise and hunting problem associated with prior art IRD sensors.

Referring to FIG. 1, there is shown a prior art xerographic Infrared Reflectance Densitometer (IRD) sensor 10. The IRD sensor 10 is utilized to measure the density of toner deposited on a photoconductor 12 of a xerographic copying or printing system. For the purpose of simplicity, hereinafter, a "xerographic copying or printing system" will be referred to as "xerographic system". Typically, a latent image is created on the surface of the photoconductor 12 by a raster output scanner (not shown). After the latent image is created, it has to be developed. Developing a latent image is defined as depositing toner on the latent image. The IRD sensor 10 measures the density of the toner deposited on the photoconductor.

The prior art IRD sensor 10 comprises a Light Emitting Diode (LED) light source 14, a photodiode 16, an automatic Gain Control (AGC) 18, an adder 20, a buffer 22, a comparator 24, a sample and hold switch 26 and a capacitor 28. The LED 14 emits a light beam 30 and shines it on the photoconductor 12. Depending on if the surface of the photoconductor 12 is bare (no toner) or it has toner, the light beam 30 will be reflected or partially absorbed and partially reflected onto the photodiode 16 respectively. It should be noted that when the photoconductor 12 is bare, majority of the light beam will be reflected onto the photodiode 16 and a minimal percentage of the light beam might be scattered. However, for the purpose of this discussion, hereinafter, it will be assumed that when the photoconductor 12 is bare, it will reflect all the light beam onto the photodiode 16.

When the surface of the photoconductor 12 has toner, depending on the amount of toner, the light beam will be absorbed at a different rate and therefore the intensity of the light beam reflected onto the photodiode 16 varies with the amount of toner.

The IRD sensor 10 converts the intensity of the light beam received through the photodiode 16 into an output voltage $V_{OUT}$ to be compared against a lookup table to indicate the density of toner on the photoconductor.

The photodiode 16 creates a current $I_{PD}$ based on the received light beam. The current $I_{PD}$ will be sent to the AGC 18 via line 32. The AGC 18 which contains a current to voltage converter, amplifies the $I_{PD}$ current to signal current $I_{SIG}$ and converts the signal current $I_{SIG}$ into a voltage $V_{SIG}$. Since the IRD sensor 10 has to measure a wide range of toner density, the signal current $I_{SIG}$ and therefore the voltage $V_{SIG}$ will have a wide dynamic range. The AGC 18 while generating $V_{SIG}$, compresses $V_{SIG}$ in order to reduce the size of the voltage $V_{SIG}$ while covering a wide dynamic range. The voltage $V_{SIG}$ is transferred to adder 20 via connection line 34, therefrom to buffer 22 via connection line 36 and eventually to the output of the buffer 22 as output voltage $V_{OUT}$. Referring to FIG. 2, the output voltage $V_{OUT}$ has a transfer curve 40 as shown by dashed lines with respect to $I_{SIG}$. However, this transfer curve 40 is not a curve to be used to determine the density of the toner. The curve 42, shown by solid line, is a reference curve that is used to determine the density of the toner.

Therefore, referring to both FIGS. 1 and 2, the IRD sensor 10 has to be calibrated to move the transfer curve 40 of the output voltage $V_{OUT}$ to match the reference curve 42. In order to calibrate the IRD sensor 10, it is necessary to adjust the driving current of the LED 14 and the gain of the AGC 18 to move the starting point a of the curve 40 to reference voltage $V_{REF}$ and the ending point b of the curve 40 to maximum voltage $V_{MAX}$. The reference voltage $V_{REF}$ is a given voltage which is the starting voltage on the reference curve 42 and the maximum voltage $V_{MAX}$ is a predetermined voltage which is the maximum voltage (end point) on the reference curve 42. Both the reference voltage $V_{REF}$ and the maximum voltage $V_{MAX}$ are determined by the requirements of the xerographic system.

The first step of the calibration is to turn Off the light source 14. While there is no light (dark) the photodiode has a leakage current $I_{DARK}$. The leakage current will be converted by the AGC 18 to voltage $V_{SIG}$ and will be transferred to the output voltage $V_{OUT}$.

The output voltage is sent to the comparator 24 via line 23. The comparator 24 also receives a reference voltage $V_{REF}$. The comparator 24, compares the output voltage $V_{OUT}$ with the reference voltage $V_{REF}$ and sends out a signal $V_{DIF}$. Depending on if the Output voltage is higher or lower, $V_{DIF}$ will have a negative value or a positive value respectively. The sample and hold switch 26 has to be closed for this step of calibration. Since the sample and hold switch is closed, $V_{DIF}$ will be transferred to the adder 20 and also will be stored in the capacitor 28. The adder 22 will add or subtract the $V_{DIF}$ to/from the output of the AGC 18 depending on if $V_{DIF}$ is positive or negative respectively. The result will then be sent to the buffer 22 and onto the output voltage $V_{OUT}$. Loop A, which comprises comparator 24, sample and hold switch 26, adder 20 and buffer 22, will force the output to be substantially equal to the reference voltage $V_{REF}$. This step of the calibration moves the starting point a of the transfer curve 40 to $V_{REF}$.

For the next step in calibration, the sample and hold switch 26 is opened, the LED 14 is turned On and the driving current of the LED 14 is increased to increase the intensity of the light beam 30. The driving current of the LED 14 is increased by counter 44 which is controlled by comparator 46. Comparator 46 receives $V_{OUT}$ via line 48 and $V_{COARSE}$ from a voltage source via line 50. If $V_{OUT}$ is less than $V_{COARSE}$, comparator 46 will send out a "0" and if $V_{OUT}$ is equal or higher than $V_{COARSE}$, comparator 46 will send out a "1". The output of comparator 46 is connected to counter 52 via line 54 and to counter 44 through an inverter 56. Every time calibration is required, counter 44 is activated by a calibration pulse Cal which is originated in a microprocessor (not shown) and is delivered via line 58. Counter 44, which is connected to the driver circuit of the LED 14 via line 60, gradually increases the current of the LED 14 as its count increases.

It should be noted that during the calibration, the photoconductor 12 is bare and therefore the light beam 30 will be reflected onto the photodiode 16. During this step, as the intensity of the light beam 30 is increased, the current generated by the photodiode 16 is also increased causing the compressed $V_{SIG}$ and as a result the output voltage $V_{OUT}$ to increase.

It should be noted that during this step and during the normal operation of the IRD sensor 10, the value $V_{DIF}$ (from the previous step), stored in the capacitor 28, is always added to the to compressed $V_{SIG}$ from AGC 18.

As the current of the LED 14 is increased, the output voltage $V_{OUT}$ will be increased. Once the output voltage $V_{OUT}$ reaches $V_{COARSE}$, the output of comparator 46 changes to "1" which stops the counter 44 and starts counter 52. $V_{COARSE}$ is the voltage of a point on the reference curve 42. $V_{COARSE}$ is selected to have a value which is between $V_{REF}$ and a predetermined maximum output voltage $V_{MAX}$. $V_{COARSE}$ is selected to allow large adjustments of calibration to be performed by increasing the driving current of the LED 14 and fine adjustments of calibration to be performed by increasing the gain of AGC 18.

Once the counter 44 is stopped, the current of the LED 14 will be fixed and once the counter 52 is started, the gain of the AGC 18 will be increased until the output voltage $V_{OUT}$ reaches the maximum output voltage $V_{MAX}$. When $V_{OUT}$ reaches $V_{MAX}$, counter 52 will be stopped by comparator 62 which receives $V_{OUT}$ via line 64 and $V_{MAX}$ from a voltage source via line 66. Comparator 62 is connected to counter 52 through inverter 68. If $V_{OUT}$ is less than $V_{MAX}$, comparator 62 will send out a "0" and if $V_{OUT}$ is equal or higher than $V_{MAX}$, comparator 62 will send out a "1". As a result, during the time that $V_{OUT}$ is less than $V_{MAX}$, the counter 52 receives a "1" and when $V_{OUT}$ reaches $V_{MAX}$, the counter receives a "0" as a stop signal.

This step of the calibration (having a fixed LED current and increasing the gain of AGC 18 until $V_{OUT}$ reaches $V_{MAX}$) moves the ending point b of the transfer curve 40 to $V_{MAX}$. Once $V_{OUT}$ reaches $V_{MAX}$, the IRD sensor is calibrated. After the IRD sensor 10 is calibrated, the driving current of the light source and the gain of the AGC 18 will be fixed for normal operation. Therefore, during the normal operation of the IRD sensor 10, the driving current of the light source 14 and the gain of the AGC 18 will be kept fixed at the values of the calibration. It should be noted that once the driving current of the light source is fixed, the intensity of the light beam is also fixed.

During normal operation, the output voltage $V_{OUT}$ of the calibrated IRD sensor 10 creates an output voltage $V_{OUT}$ with a transfer curve similar to reference curve 42. The transfer curve of the output voltage $V_{OUT}$ is utilized to be compared against a lookup table to determine the density of the toner on the photoconductor 12. The reference curve 42 of FIG. 2 is based on the following equation:

$$V_{OUT}=V_{REF}+K[(I_{SIG}+I_{DARK})^{1/2}-(I_{DARK})^{1/2}]. \quad (1)$$

Where K is a gain factor of AGC 18.

The IRD sensor 10 of FIG. 1 has several problems. One problem is the noise that is introduced into the circuit through the sample and hold switch 26. By closing and opening the sample and hold switch 26 during the calibration, the noise caused by opening switch 26 will disturb the calibration of the starting point $V_{REF}$. Therefore, the IRD sensor 10 of FIG. 1 does not have a precise calibration.

Another problem is that the output voltage $V_{OUT}$ is dependent on $I_{DARK}$, the leakage current of the photodiode 16, which significantly varies during the normal operation of the IRD sensor 10. Therefore, due to the variations of $I_{DARK}$, the output voltage $V_{OUT}$ varies.

However, the major problem of the IRD sensor 10 of FIG. 1 is a phenomenon known as "hunting". Hunting occurs during the power up calibration and also during self calibration. The IRD sensor 10 occasionally performs a self calibration in order to compensate for the performance deterioration due to dirt contamination and other factors. During each calibration, the IRD sensor 10 tries to adjust the starting point and as it adjusts the staring point, the maximum voltage $V_{MAX}$ will be disturbed and as the sensor tries to adjust the maximum voltage $V_{MAX}$, the starting point will be disturbed. As a result, the IRD sensor 10 of FIG. 1 will fall into a loop trying to obtain a stable starting point $V_{REF}$ and an ending point $V_{MAX}$. This phenomenon is called "hunting".

Hunting occurs due to the fact that during the first part of the calibration, the gain of AGC 18 is set to a certain (first) value. Therefore, $V_{DIF}$ stored in capacitor 28 is generated based on the first value of the gain of AGC 18. However, in the second portion of the calibration, after the driving current of the LED is fixed, the gain of the AGC is increased. In the second portion of the calibration, the gain of AGC 18 is changing, but $V_{DIF}$ which is being added to $V_{SIG}$ is the $V_{DIF}$ that was generated from the first value of the gain of AGC 18. Therefore, this circuit does not provide a precise calibration.

It is an object of this invention to furnish an IRD sensor which eliminates the hunting phenomenon, reduces noise and provides an output voltage $V_{OUT}$ with a precise calibration.

SUMMARY OF THE INVENTION

In accordance with the present invention, there is disclosed an infrared reflectance densitometer (IRD) sensor which eliminates a phenomenon known as hunting, reduces noise and provides an output voltage with a precise calibration. The IRD sensor of this invention has four distinct blocks each of which generates one of the elements of a given equation and a fifth block which generates an output voltage $V_{OUT1}$ based on the given equation.

DETAILED DESCRIPTION OF THE INVENTION

Figure 3:
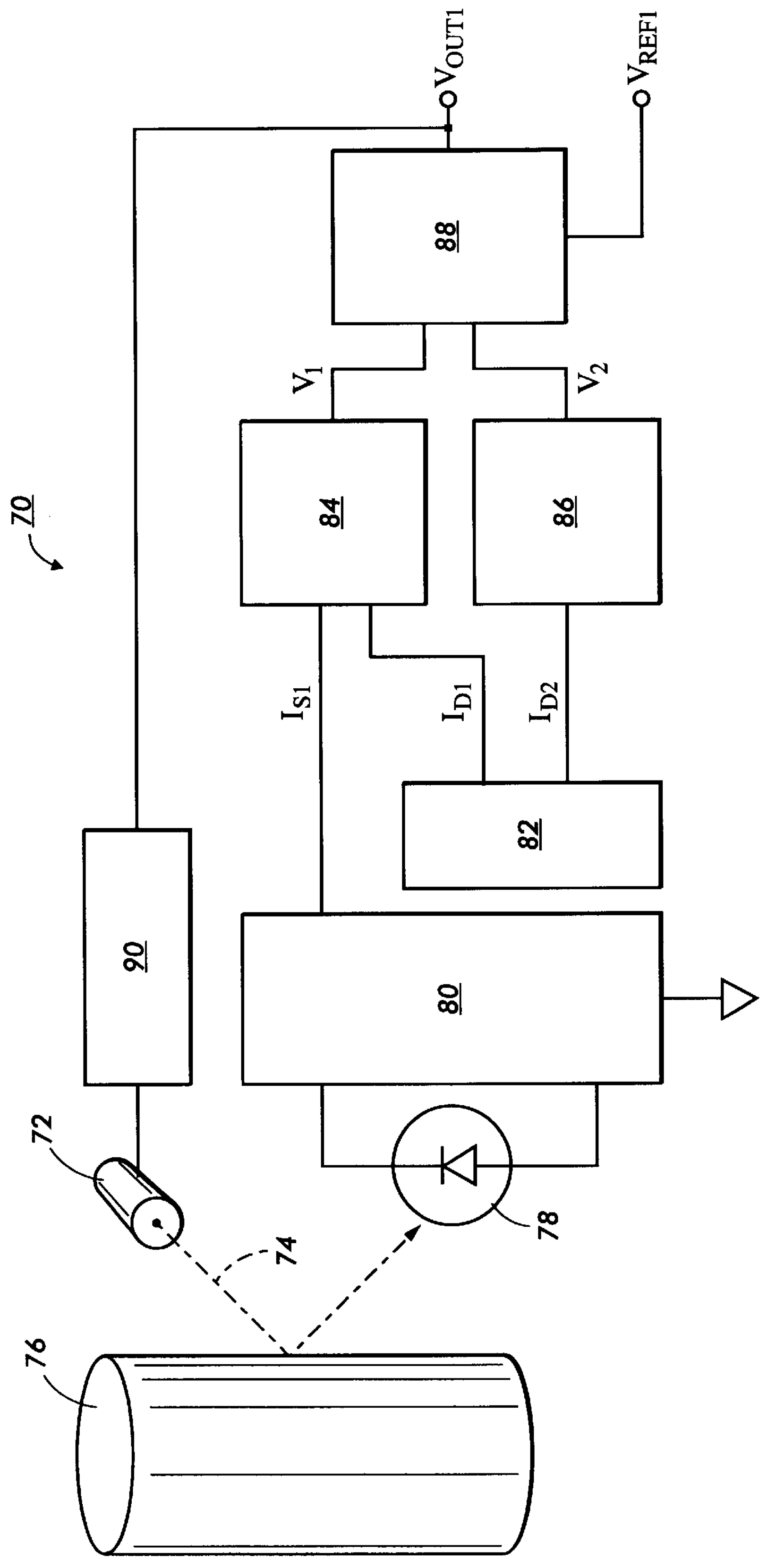
FIG. 3 shows a block diagram of the IRD sensor of this invention.

Referring to FIG. 3 there is shown an IRD sensor 70 of this invention. In FIG. 3, a LED light source 72 emits a light beam 74 which is shone onto a photoconductor 76. The photoconductor 76 will reflect the light beam 74 or absorb a portion of the light beam 74 and reflect the remaining light beam 74 depending on if the photoconductor is bare or it has toner respectively. The reflected light beam will shine on a photodiode 78.

The IRD sensor 70 of this invention is designed to create the equation (1)

$$V_{OUT}=V_{REF}+K[(I_{SG}+I_{DARK})^{1/2}-(I_{DARK})^{1/2}]. \quad (1)$$

The IRD sensor 70 has five distinct blocks 80, 82, 84, 86 and 88 each of which generates one of the elements of the equation (1). The IRD sensor 70 of this invention also has an additional block 90 for controlling the current of the LED 72. The photodiode 78 of block 80 generates a current $I_{PD1}$. Block 80 amplifies the current $I_{PD1}$ and generates $I_s$ which is equivalent to $I_{SIG}$ of the equation (1). Block 82 which does not have any connection to the photodiode 78 generates $I_D$ which is independent of the leakage current of the photodiode 78. $I_D$ is the equivalent of $I_{DARK}$ of equation (1). Block 84 uses $I_{S1}$, a mirrored current of $I_S$, from block 80. It should be noted that current $I_{S1}$ can be equal to $I_S$ or can be equal to amplified $I_S$. Block 84 also uses $I_{D1}$, a mirrored current of $I_D$ from block 82, to generate voltage $V_1$. Block 86 uses $I_{D2}$, a mirrored current of $I_D$ from block 82, to generate voltage $V_2$. Currents $I_{D1}$ and $I_{D2}$ are equal to $I_D$.

Where $V_1$ is:

$$V_1=-K_1(I_{S1}+I_{D1})^{1/2}+V_t \quad (2)$$

and $V_2$ is:

$$V_2=-K_1(I_{D2})^{1/2}+Vt \quad (3).$$

Where $K_1$ is the gain factor in blocks 84 and 86. The elements of equations 2 and 3 will be described in great detail hereinafter.

Both voltages $V_1$ and $V_2$ are used in block 88 which also receives a reference voltage $V_{REF1}$ from an external source. Block 88 generates an output voltage $V_{OUT1}$ which is equal to:

$$V_{OUT1}=V_{REF1}+V_2-V_1=V_{REF1}+K_1[(I_{S1}+I_{D1})^{1/2}-(I_{D2})^{1/2}].+\text{tm}$$
(4)=(1)

Figure 4:
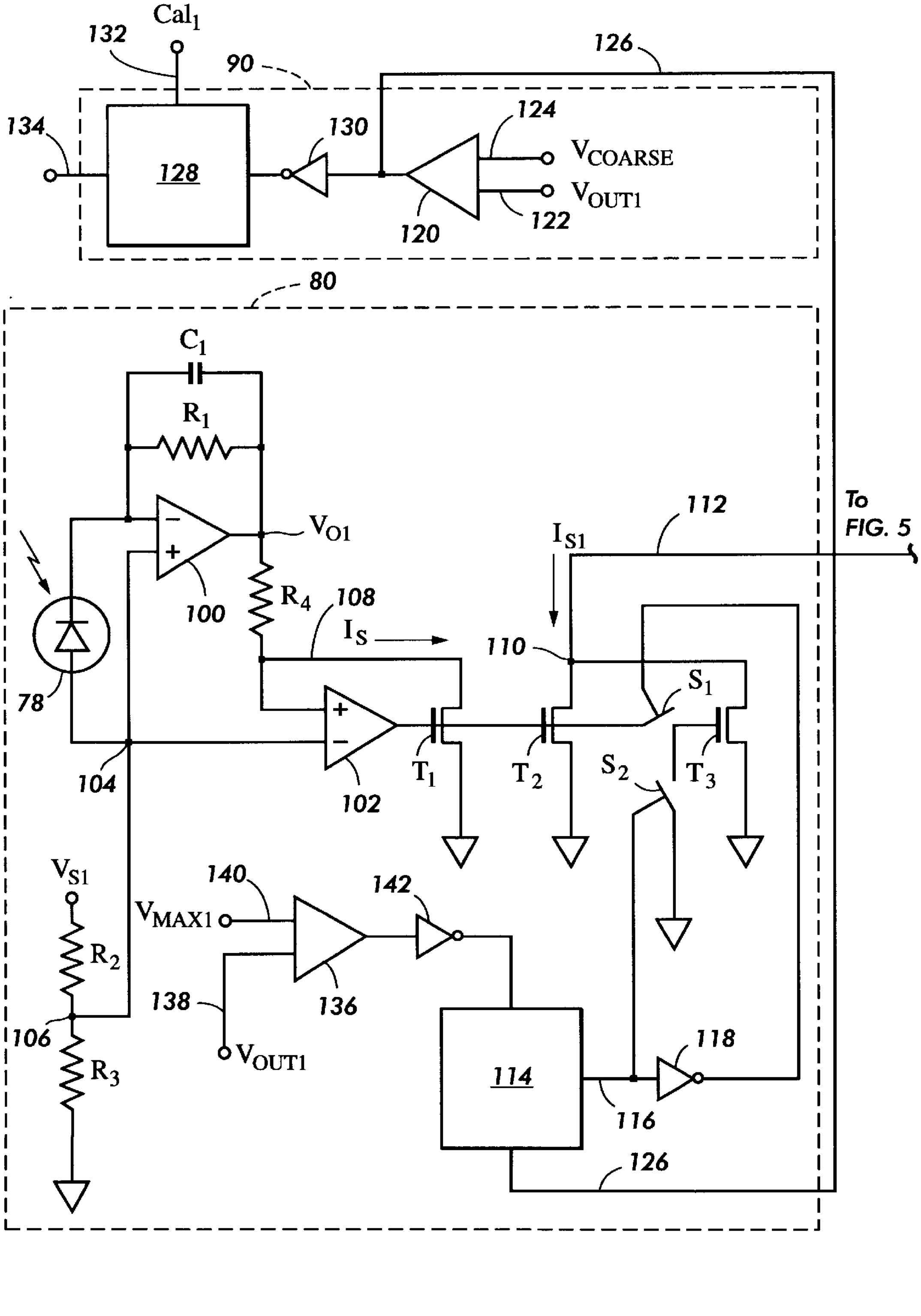
FIG. 4 shows the circuit diagram of blocks 80 and 90 of FIG. 3.

Referring to FIG. 4, there is shown a circuit diagram of the blocks 80 and 90 of the IRD sensor 70 of this invention. Block 80, which is responsible for generating $I_S$, receives the signal $I_{PD1}$ from the photodiode 78. In block 80, the cathode of the photodiode 78 is connected to the inverting input (−) of the op-amp 100 and anode of the photodiode 78 is connected to the non-inverting input (+) of the op-amp 100 and to the inverting input of op-amp 102 through node 104. The inverting input of the op-amp 100 is also connected to the output of the op-amp 100 via resistor $R_1$ and the capacitor $C_1$ which are parallel to each other. Node 104 is connected to node 106. Node 106 is a node between two resistors $R_2$ and $R_3$. Resistor $R_2$ is connected between a voltage source $V_{S1}$ and node 106 and the resistor $R_3$ is connected between the node 106 and ground. The output of the op-amp 100 is connected to the non-inverting input of the op-amp 102 through resistor $R_4$. The non-inverting output of the op-amp 102 is also connected to the drain of the transistor $T_1$ via line 108. The gate of transistor $T_1$ is connected to the output of the op-amp 102 and the source of the transistor $T_1$ is connected to ground.

In block 80, the voltage source $V_{S1}$ creates a current through the resistors $R_2$ and $R_3$ which in turn create a voltage $V_B$ at node 106 to be used as a bias voltage for op-amps 100 and 102. The bias voltage $V_B$ is connected to the non-inverting input of op-amp 100 and to the inverting input of the op-amp 102 through node 106 which is the same as node 104. The photodiode 78 generates a current $I_{PDI}$ and supplies it to the op-amp 100. The op-amp 100 generates an output voltage which is:

$$V_{01}=V_B+R_1\cdot I_{PD1}.$$

Since the non-inverting input of the op-amp 102 has a large impedance, it does not draw any current and since the op-amp 102 is in linear mode, the voltage of the non-inverting input is forced to be equal to the voltage of the inverting input ($V_B$). Therefore, the voltage difference across the resistor R4 is:

$$V_{01}-V_B=(V_B+R_1\cdot I_{PD1})-V_B=R_1\cdot I_{PD1}.$$

Thus, the current $I_1$ across resistor $R_4$ is:

$$I_1=(R_1/R_4)\cdot I_{PD1}.$$

Therefore, the current $I_1$ is the amplified version of current $I_{PD1}$.

Figure 5:
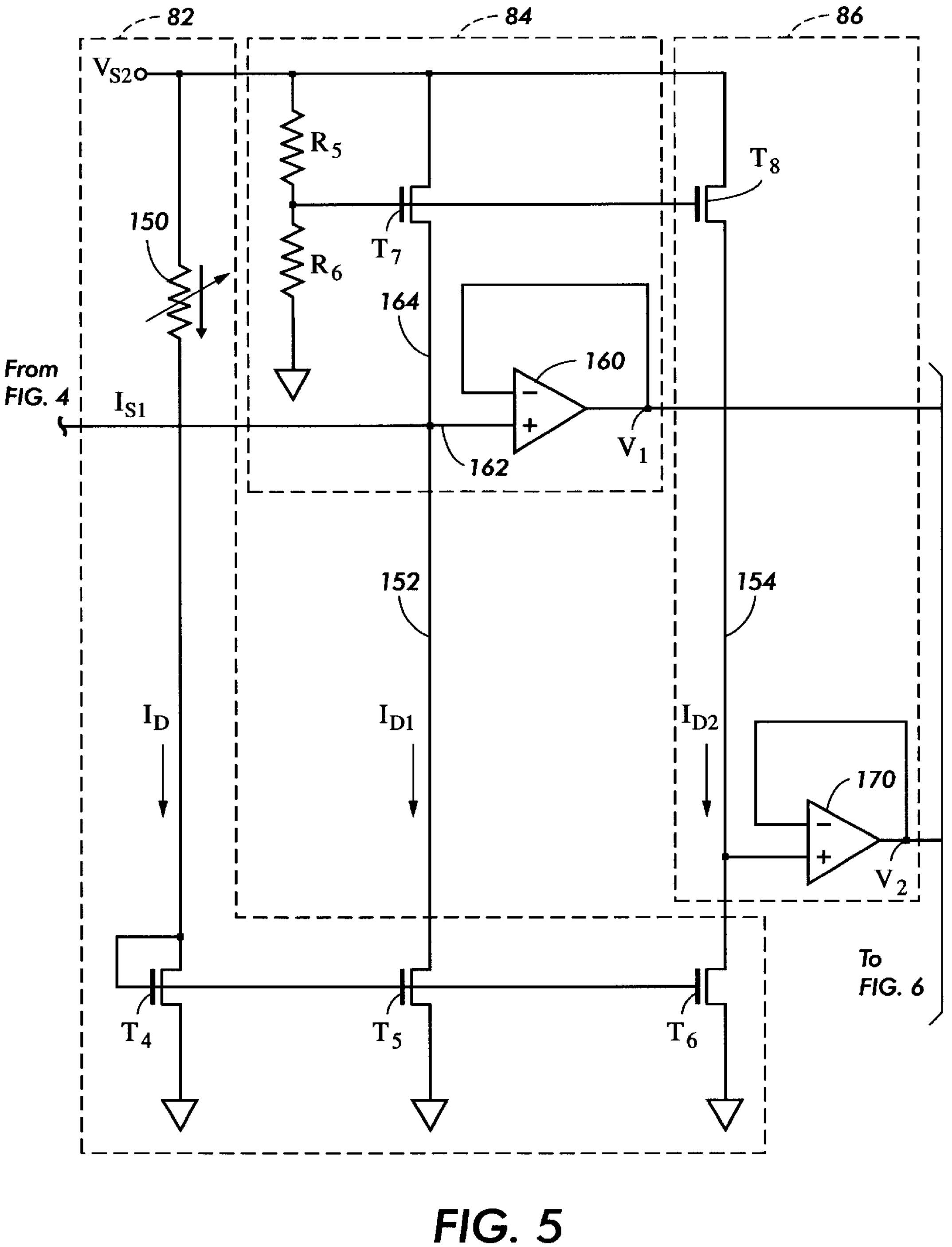
FIG. 5 shows the circuit diagram of blocks 82, 84 and 86 of FIG. 3.

Since the non-inverting input of op-amp 102 does not draw any current, the acurrent $I_1$ across resistor $R_4$ will flow into the drain of the transistor $T_1$ via the connection line 108. The gate of the transistor $T_1$ is also connected to the gate of transistors $T_2$. The gates of both transistors $T_1$ and $T_2$ are connected to the gate of the transistor $T_3$ through a switch $S_I$ and the gate of the transistor $T_3$ is connect to ground through a switch $S_2$. The source of both transistors $T_2$ and $T_3$ are connected to the ground and the drains of the transistors $T_2$ and $T_3$ are connected to each other at node 110. Node 110 is connected to the source of transistor $T_7$ of block 84 through line 112 (FIG. 5).

In block 80, current $I_1$ is mirrored by transistors $T_2$ and $T_3$. Each one of the transistors $T_2$ and $T_3$ has a different size to amplify the mirrored current by a different factor. Depending on the required current, either transistors $T_2$ or both transistors $T_2$ and $T_3$ will be selected as a mirror transistor. The selection of the transistors $T_2$ and $T_3$ is done by a counter 114.

It should be noted that for the purpose of simplicity, in FIG. 4, only two mirror transistors $T_2$ and $T_3$ are shown. However, depending on the design requirements of IRD sensor 70, the number of mirror transistors can be increased or decreased to provide more or less flexibility in selecting gain of the mirrored current respectively.

Switches $S_1$ and $S_2$ are controlled by a counter 114. The output 116 of counter 114 is connected to switch $S_1$ directly and to switch $S_2$ through inverter 118. With this configuration, when transistor $T_3$ is needed, counter 114 causes switch $S_1$ to close and switch $S_2$ to open. This causes the gate of transistor $T_3$ to be connected to the gate of transistor $T_2$. However, when $T_3$ is not needed, counter 114 will open switch $S_1$ and close switch $S_2$. This will cause the gate of transistor $T_3$ to be disconnected from transistor $T_2$ and grounded. This in turn will cause transistor $T_3$ to be inactivated.

Counter 114 is activated by a signal from comparator 120. In block 90, comparator 120 receives $V_{OUT1}$ via line 122 and $V_{COARSE1}$ from a voltage source via line 124. It should be noted that in this invention, $V_{COARSE1}$, $V_{MAX1}$ and $V_{REF1}$ are equivalent to $V_{COARSE}$, $V_{MAX}$ and $V_{REF}$ of prior art respectively. If $V_{OUT1}$ is less than $V_{COARSE1}$, the comparator 120 will send out a "0" and if $V_{OUT1}$ is equal or higher than $V_{COARSE1}$, the comparator 120 will send out a "1". The output of the comparator 120 is connected to counter 114 via line 126 and also connected to counter 128 through an inverter 130.

Every time calibration is required, counter 128 is activated by a calibration pulse Ca1l which is originated in a microprocessor (not shown) and delivered via line 132. Counter 128, which is connected to the driver circuit of the LED 72 via line 134, gradually increases the current of the LED 72. As the current of the LED 72 is increased, the output voltage $V_{OUT1}$ will be increased. Once the output voltage $V_{OUT1}$ reaches $V_{COARSE1}$, the output of comparator 120 changes to "1" which stops the counter 128 and starts counter 114.

At this time the current of the LED 72 will be fixed and the counter 114 closes switch $S_1$ and opens switch $S_2$ to activate transistor $T_3$. If the circuit has more transistors, counter 114 gradually activates one transistor at a time, as its count increases. Counter 114 keeps counting until it receives a stop signal from comparator 136. Comparator 136, which receives $V_{OUT1}$ via line 138 and $V_{MAX1}$ from a voltage source via line 140, is connected to counter 114 through inverter 142. If $V_{OUT1}$ is less than $V_{MAX1}$, the comparator 136 will send out a "0" and if $V_{OUT1}$ is equal or higher than $V_{MAX1}$, the comparator 136 will send out a "1". As a result, during the time that $V_{OUT1}$ is less than $V_{MAX1}$, the counter receives a "1" and when $V_{OUT1}$ reaches $VMAX_1$, the counter receives a "0" as a stop signal.

The mirrored current from either $T_2$ or $T_2$ and $T_3$ is the $I_{S1}$ of equation (4) which is the same as equation (1). Transistors $T_2$ or $T_3$ create a current sink in which if only $T_2$ is On, $I_{S1}$ will be equal to $I_S$ and if both transistors $T_2$ and $T_3$ are On, $I_{S1}$ will be equal to a amplified $I_S$. When both transistors $T_2$ and $T_3$ are On, the current $I_{S1}$ is increased by the amount of current added by transistor $T_3$.

In this invention, the leakage current of the photodiode 78 is substantially minimized. The non-inverting input of op-amp 100 is connected to the bias voltage $V_B$ and therefore the inverting input of op-amp 100 is also forced to be substantially equal to the bias voltage $V_B$. As a result, both terminals (cathode and anode) of the photodiode 78 have substantially equal voltages. This will substantially reduce the leakage current of the photodiode 78 and reject the common mode noise picked up by the photodiode 78. Typically, the common mode noise is picked up by a photodiode when there is a voltage difference between its two terminals.

Referring to FIG. 5, there is shown a circuit diagram of blocks 82, 84 and 86. In block 82, $I_D$ is being generated independent of the leakage current of photodiode 78. A variable resistor 150, which is connected to a voltage source $V_{S2}$ and transistor $T_4$, creates $I_D$ which is equivalent to $I_{DARK}$. The gate of transistor $T_4$ is connected to its drain and the drain of transistor $T_4$ is connected to the variable resistor 150 and the source of transistor $T_4$ is connected to ground.

Since $I_D$ is needed for two different blocks 84 and 86, the $I_D$ is duplicated by two mirror Transistors $T_5$ and $T_6$. The gate of transistor T4 is connected to the gates of mirror transistors T5 and T6. Sources of mirror transistors T5 and T6 are both connected to ground. The drain of mirror transistor T5 is connected to the source of transistor T7 of block 84 and the drain of mirror transistor T6 is connected to the source of transistor T8 of block 86. Mirror transistor $T_5$ creates a current sink for block 84 and the mirror transistor creates a current sink for block 86. The mirror transistors $T_5$ and $T_6$ force the current $I_{D1}$ on the connection line 152 (block 84) and the current $I_{D2}$ on the connection line 154 (block 86) to be identical to the $I_D$ from the variable resistor 150. Therefore, currents $I_{D1}$ and $I_{D2}$ are substantially equal.

In Block 84, resistor $R_5$ is connected between the voltage source $V_{S2}$ and the gate of transistor $T_7$ and resistor R6 is connected between the gate of transistor $T_7$ and ground. The drain of transistor $T_7$ is connected to the voltage source $V_{S2}$ and the source of the transistor $T_7$ is connected to the non-inverting input of op-amp 160, to the drain of mirror transistor $T_5$, and to the drains of mirror transistors $T_2$ and $T_3$ of block 80 through the connection lines 162, 152 and 112 respectively. The gate of the transistor $T_7$ is also connected to the gate of the transistor $T_8$ of the block 86. The inverting input of op-amp 160 is connected to its output which is connected to block 88.

In block 84, the current on the connection line 112 is $I_{S1}$ and the current on the connection line 152 is $I_{D1}$. Current $I_{S1}$ flows into the current sink of block 80 and current $I_{D1}$ flows into the current sink of block 82. Since the op-amp 160 is used as a buffer, it does not draw any current. Therefore, the current of the source (shown as the connection line 164) of the transistor $T_7$ is equal to: $I_{S1}+I_{D1}$. The gate to source voltage $V_{GS7}$ of the transistor $T_7$ is given by:

$$V_{GS7}=K_1(I_{SOURCE7})^{1/2}+V_t$$

and since $$I_{SOURCE7})=I_{S1}+I_{D1}$$

and the gate voltage of the transistor $T_7$ is $V_{B1}$ then $$V_{GS7}=K_1(I_{S1}+I_{D1})^{1/2}+V_t.$$

Therefore, the source voltage of transistor $T_7$ is:

$$V_{S7}=-[K_1(I_{S1}+I_{D1})^{1/2}+V_t]+V_{B1}.$$

Where $K_1$ is the gain factor of transistor $T_7$.

Since the non-inverting input of the op-amp 160 is connected to the source of the transistor $T_7$, it has the same voltage as the source voltage $V_{S7}$ of the transistor $T_7$. Therefore, the output voltage $V_1$ of the op-amp 160, which is connected to the inverting input of op-amp 160 is substantially equal to the non-inverting input voltage of op-amp 160 which is equal to the source voltage of transistor $T_7$:

$$V_1=V_{S7}=-[K_1(I_{S1}+I_{D1})^{1/2}+V_t]+V_{B1}.$$

In block 86, the drain of transistor $T_8$ is connected to the voltage source $V_{S2}$ and its source is connected to the non-inverting input of op-amp 170 and to the drain of mirror transistor $T_6$. The inverting input of op-amp 170 is connected to its output which is connected to block 88. Since the op-amp 170 is used as a buffer, it does not draw any current. Therefore, the source current of the transistor $T_8$ is: $I_{SOURCE8}=I_{D2}$. Current $I_{D2}$ flows into the current sink of block 82 to be limited to current $I_D$. The gate to source voltage of transistor $T_8$ is:

$$V_{GS8}=K_1(I_{D2})^{1/2}+V_t$$

and since the gate voltage of transistor $T_8$ is $V_{B1}$: the source voltage of transistor $T_8$ is:

$$V_{S8}=-[K_1(I_{D2})^{1/2}+V_t]+V_{B1}.$$

Where $K_1$ is the gain factor of transistor $T_8$. It should be noted that the gain factor $K_1$ of both transistors $T_7$ and $T_8$ are equal.

Since the non-inverting input of the op-amp 170 is connected to the source of the transistor $T_8$, it has the same voltage as the source voltage $V_{S8}$. Therefore, the output voltage $V_1$ of the op-amp 170, which is connected to the inverting input of op-amp 170 is substantially equal to the non-inverting input voltage of op-amp 170 which is equal to the source voltage of transistor $T_8$:

$$V_2=V_{S8}=-[K_1(I_{D2})^{1/2}+V_t]+V_{B1}.$$

Figure 6:
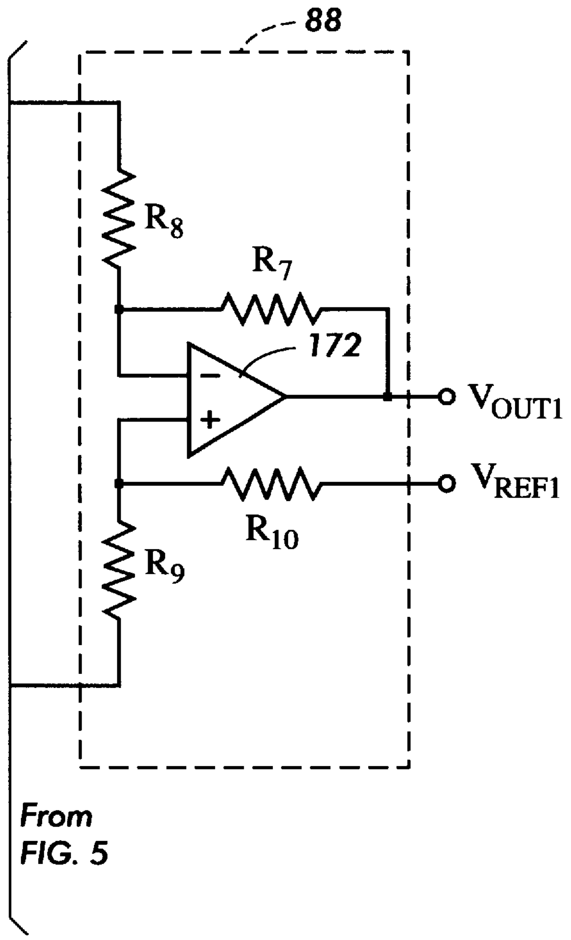
FIG. 6 shows the circuit diagram of block 88 of FIG. 3.

Referring to FIG. 6, there is shown a circuit diagram of block 88 of the IRD sensor 70 of FIG. 3. In block 88, the inverting input of op-amp 172 is connected to its output through resistor $R_7$ and to the output of the op-amp 160 through resistor $R_8$. The non-inverting input of the op-amp 172 is connected to the output of the op-amp 170 through resistor $R_9$ and to a voltage source $V_{REF1}$ through resistor $R_{10}$. The voltage source $V_{REF1}$ generates the reference voltage which is required by the xerographic system. Therefore, the voltage of the non-inverting input of the op-amp 172 is: $V_{REF1}+V_2$ and the voltage of the inverting input of the op-amp is: $V_1$.

In block 88, the op-amp 172 is used as a subtractor which subtracts the non-inverting input voltage from the inverting input voltage. As a result, the output voltage of the op-amp 172 is:

$$V_{OUT1}=V_{REF1}+V_2-V_1.$$

Since $$V_1=V_{S7}=-[K_1(I_{S1}+I_{D1})^{1/2}+V_t]+V_{B1}$$

and $$V_2=V_{S8}=-[K_1(I_{D2})^{1/2}+V_t]+V_{B1}.$$

Therefore, $$V_{OUT1}=V_{REF1}-[K_1(I_{D2})^{1/2}+V_t]+V_{B1}+[K_1(I_{S1}+I_{D1})^{1/2}+V_t]-V_{B1}$$

$$V_{OUT1}=V_{REF1}+K_1[(I_{S1}+I_{D1})^{1/2}-(I_{D2})^{1/2}]. \quad (1)$$

Figure 1:
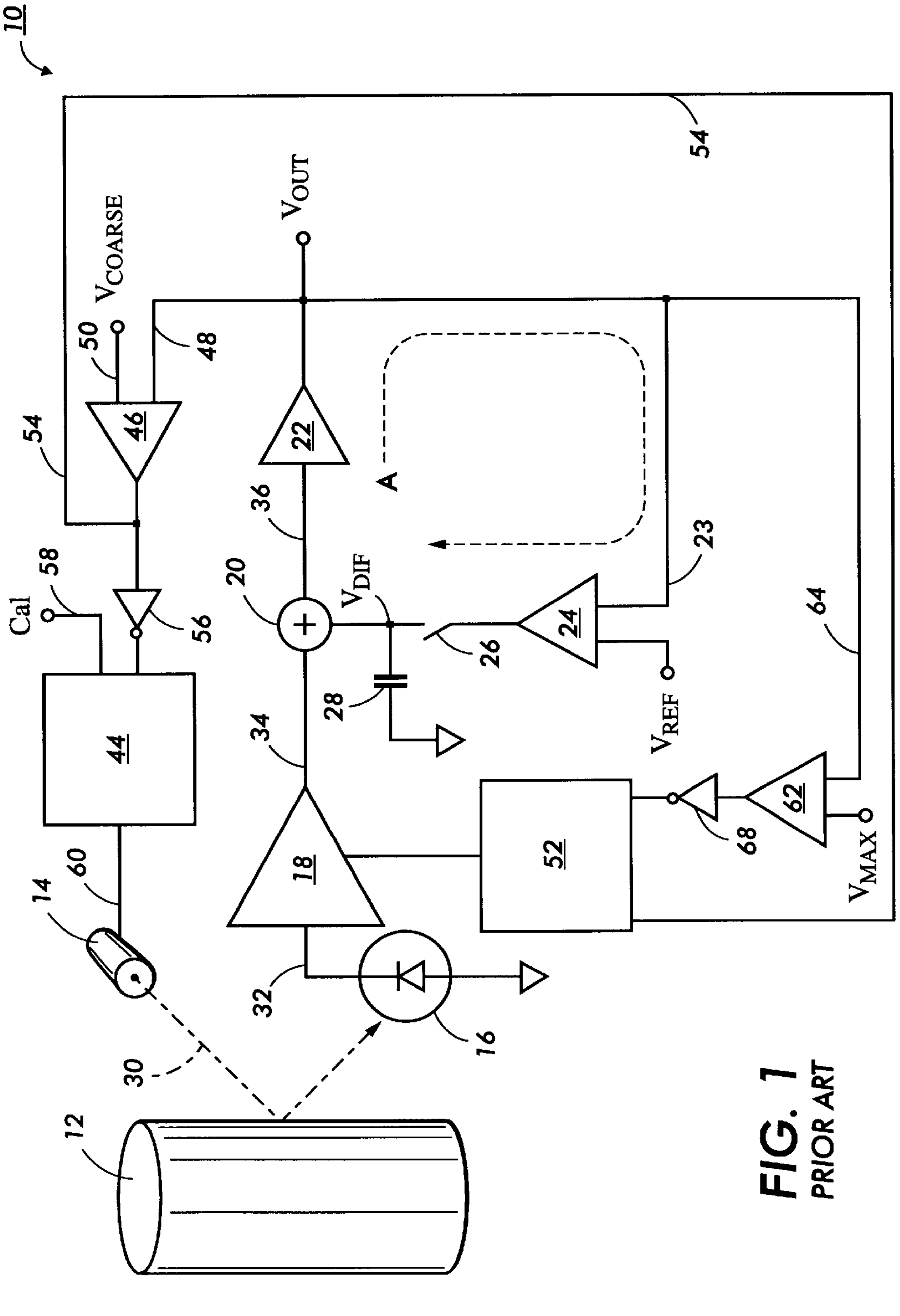
FIG. 1 PRIOR ART
FIG. 1 shows a prior art IRD sensor.
Figure 2:
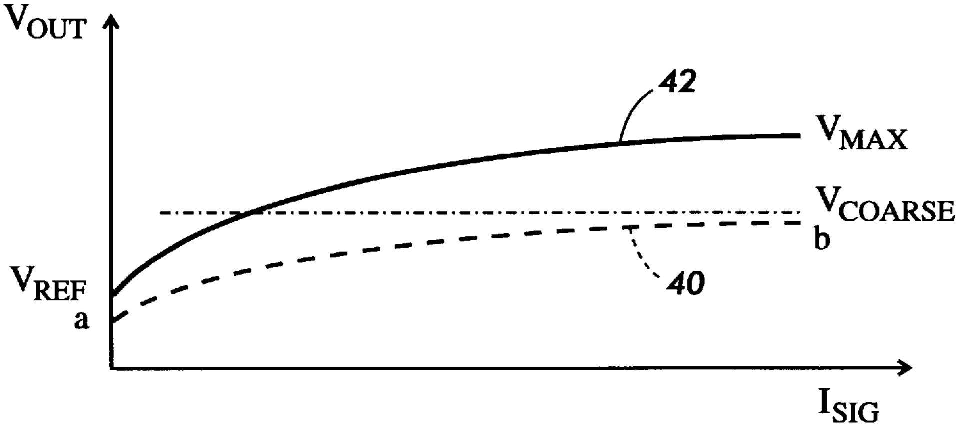
FIG. 2 PRIOR ART
FIG. 2 shows a curve (shown by solid line) used to determine the density of the toner and a transfer curve of the output voltage (shown by dashed line) of the IRD sensor of FIG. 1.

The output voltage of the IRD sensor 70 of FIG. 3, eliminates the hunting problem and the noise problem associated with the sample and hold switch 26 of FIG. 1. The IRD sensor 70 of this invention, also creates a precise curve based on equation 1.

Furthermore, the curvature of the transfer curve of the output voltage generated by the IRD sensor 70 of FIG. 4 can be changed. In the IRD sensor 10, since $I_{D1}$ and $I_{D2}$ are generated independent of the leakage current of the photodiode 78, they can be changed. By changing $I_D$, both $I_{D1}$ and $I_{D2}$ will be changed. $I_D$ can be changed by varying the value of the variable resistor 150. Once $I_D$ is changed, the curvature of the curve of the output voltage $V_{OUT1}$ generated by the IRD sensor of this invention will be changed. This feature, allows the IRD sensor of this invention to be used with different reference curves. By adjusting the IRD, the transfer curve of the output voltage $V_{OUT1}$ of the IRD sensor of this invention can be adjusted to match different reference curves.

It should be noted that numerous changes in details of construction and the combination and arrangement of elements may be resorted to without departing from the true spirit and scope of the invention as hereinafter claimed.

We claim:

1. In a xerographic system which has an infrared reflectance densitometer sensor for sensing light reflected off toner on a photoconductor comprising:

a circuit for generating a reference curve to determine the density of toner on the photoconductor:

a first current generator having a photodiode responsive to a reflected light from said toner on the photoconductor;

a second current generator;

a first voltage generator for generating a first voltage;

a second voltage generator for generating a second voltage;

said first current generator being electrically connected to said first voltage generator;

said second current generator being electrically connected to said first and said second voltage generators;

said first voltage generator having a first current and a second current;

said second voltage generator having a third current;

said first current generator having a current sink to limit said first current of said first voltage generator to a first given value;

said second current generator having a first current sink to limit said second current to a second given value and a second current sink to limit said third current to said second given value;

said first voltage generator being responsive to said first current and said second current to generate said first voltage;

said second voltage generator being responsive to said third current to generate said second voltage;

an output voltage generator;

said first voltage generator being electrically connected to said output voltage generator for supplying said first voltage to said output voltage generator;

said second voltage generator being electrically connected to said output voltage generator for supplying said second voltage to said output voltage generator;

means for supplying a reference voltage;

said reference voltage supplying means being electrically connected to said output voltage generator; and said output voltage generator being responsive to said first voltage generator, said second voltage generator and said reference voltage supplying means to generate an output voltage by adding said reference voltage and said second voltage and subtracting said first voltage;

said output voltage being equal to:

$$V_{OUT1}=V_{REF1}+K[(I_{S1}+I_{D1})^{1/2}-(I_{D2})^{1/2}]$$

wherein:

$I_{S1}$=said first current,
$I_{D1}$=said second current,
$I_{D2}$=said third current; and
$V_{OUT1}$=reference curve.

* * * * *